(12) United States Patent
Price (10) Patent No.: US 10,807,626 B2
(45) Date of Patent: Oct. 20, 2020

(54) SPECIAL BIG-4 WHEELER SWIVEL WHEELED WHEELBARROW

(71) Applicant: Lucky W Price, Anderson, IN (US)

(72) Inventor: Lucky W Price, Anderson, IN (US)

( * ) Notice: Subject to any disclaimer, the term of this patent is extended or adjusted under 35 U.S.C. 154(b) by 0 days.

(21) Appl. No.: 16/228,134

(22) Filed: Dec. 20, 2018

(65) Prior Publication Data

US 2019/0193767 A1    Jun. 27, 2019

Related U.S. Application Data

(60) Provisional application No. 62/607,972, filed on Dec. 20, 2017.

(51) Int. Cl.
*B62B 3/00* (2006.01)
*B62B 5/04* (2006.01)
*B62B 3/10* (2006.01)

(52) U.S. Cl.
CPC ........... *B62B 3/008* (2013.01); *B62B 5/04* (2013.01); *B62B 3/104* (2013.01); *B62B 2301/044* (2013.01); *B62B 2301/0467* (2013.01); *B62B 2501/06* (2013.01)

(58) Field of Classification Search
CPC ... B62B 3/008; B62B 5/04; B62B 2301/0467; B62B 2301/044; B62B 3/104; B62B 2501/06; B62B 5/0433; B62B 5/0485; B62B 1/18; B62B 1/186
See application file for complete search history.

(56) References Cited

U.S. PATENT DOCUMENTS

| | | | | |
|---|---|---|---|---|
| 717,471 A * | 12/1902 | Tanner | ............................ | 280/43 |
| 1,340,898 A * | 5/1920 | Keminskis | .............. | B62B 1/183 |
| | | | | 280/47.34 |
| 1,735,527 A * | 11/1929 | Cwik | ........................ | B62B 1/18 |
| | | | | 280/43.22 |
| 2,598,261 A * | 5/1952 | Hrabal | ..................... | B62B 1/20 |
| | | | | 280/47.17 |
| 3,858,929 A * | 1/1975 | Brescia | ..................... | B62B 3/08 |
| | | | | 280/47.12 |
| 3,950,005 A * | 4/1976 | Patterson | ................. | B62B 5/04 |
| | | | | 280/47.31 |
| 4,061,349 A * | 12/1977 | Stahl | ........................ | B62B 1/20 |
| | | | | 280/47.2 |
| 4,767,128 A * | 8/1988 | Terhune | .................... | B62B 1/18 |
| | | | | 188/19 |
| 4,811,988 A * | 3/1989 | Immel | ....................... | B62B 3/08 |
| | | | | 180/19.1 |
| RE33,131 E * | 12/1989 | Morrison | .................. | B60P 1/16 |
| | | | | 298/1 H |
| 5,031,926 A * | 7/1991 | Wannamaker | ............ | B62B 1/20 |
| | | | | 280/47.2 |

(Continued)

*Primary Examiner* — Jacob B Meyer
(74) *Attorney, Agent, or Firm* — Ritchison Law Offices, PC; John D. Ritchison (57) ABSTRACT

An auxiliary wheel assembly mounted on a selected portion of a wheelbarrow comprising: several structural members namely a urethane receptacle barrow, a front support and dual swivel wheel assembly, a dual rear support and wheel assembly with a plurality of heavy duty wheels, and a manner to connect these front and rear assemblies and barrow. The various component members are potentially made of various materials and are designed for original equipment offerings or aftermarket additions to currently produced wheel barrows.

6 Claims, 6 Drawing Sheets

(56) References Cited

U.S. PATENT DOCUMENTS

| | | | | |
|---|---|---|---|---|
| 5,033,760 | A * | 7/1991 | Evans | B62B 1/20 280/47.26 |
| 5,106,113 | A * | 4/1992 | Piacentini | B62B 1/22 280/38 |
| D329,726 | S | 9/1992 | Travis | |
| 5,149,116 | A * | 9/1992 | Donze | B62B 1/20 280/47.26 |
| 5,284,218 | A * | 2/1994 | Rusher, Jr. | B62B 3/04 180/19.1 |
| 5,350,030 | A * | 9/1994 | Mawhinney | B62B 1/24 180/19.3 |
| 5,509,681 | A * | 4/1996 | Keller | B62B 1/002 280/415.1 |
| 5,692,761 | A * | 12/1997 | Havlovitz | B62B 1/006 280/33.994 |
| 6,148,963 | A * | 11/2000 | Canfield, Jr. | B60T 1/06 188/2 D |
| 6,220,622 | B1 * | 4/2001 | Garcia | B62B 1/20 269/17 |
| 6,241,276 | B1 | 7/2001 | Wilburn | |
| 6,257,358 | B1 * | 7/2001 | Roach | B62D 51/005 180/19.1 |
| 6,508,478 | B1 * | 1/2003 | Ortez | B62B 1/20 280/47.31 |
| 6,880,852 | B2 * | 4/2005 | Lim | B62B 1/20 16/426 |
| 7,017,998 | B2 * | 3/2006 | Ducharme | A01D 43/00 298/1 C |
| 7,032,718 | B1 * | 4/2006 | Lessard | B62B 5/04 188/19 |
| D527,157 | S * | 8/2006 | Boon | D34/16 |
| 7,396,027 | B1 * | 7/2008 | Lovmark | B62B 1/22 280/47.34 |
| 7,472,917 | B2 * | 1/2009 | Loudon | B60D 1/00 280/292 |
| 7,540,521 | B2 * | 6/2009 | Ragusa | A43B 1/0009 280/415.1 |
| 7,547,026 | B2 * | 6/2009 | Morris | B62B 1/18 280/47.31 |
| 7,845,654 | B2 * | 12/2010 | Price, Jr. | B62B 1/002 280/47.31 |
| 8,231,132 | B2 * | 7/2012 | DiLorenzo, Sr. | B62B 5/04 280/47.31 |
| 8,444,166 | B1 * | 5/2013 | Jarvis | B62B 3/00 280/415.1 |
| 9,108,690 | B2 * | 8/2015 | Rowlands | B60L 7/003 |
| D752,834 | S * | 3/2016 | Wyse | D34/12 |
| D752,835 | S * | 3/2016 | Wyse | D34/16 |
| 9,327,747 | B2 * | 5/2016 | Jarvis | B62B 3/00 |
| 9,623,778 | B2 * | 4/2017 | Jarvis | B62D 63/064 |
| 10,046,782 | B2 * | 8/2018 | Dechant | B62B 1/20 |
| 10,053,126 | B2 * | 8/2018 | Buttimer | B62B 3/08 |
| 2003/0006570 | A1 | 1/2003 | Baker | |
| 2003/0015852 | A1 * | 1/2003 | Swift | B62B 1/18 280/47.34 |
| 2004/0164509 | A1 * | 8/2004 | Campbell | B62B 1/002 280/47.31 |
| 2005/0134012 | A1 * | 6/2005 | Kan | B62B 3/08 280/47.34 |
| 2005/0212237 | A1 * | 9/2005 | Lin | B62B 1/002 280/47.31 |
| 2007/0085284 | A1 * | 4/2007 | Loudon | B60D 1/00 280/47.34 |
| 2007/0194544 | A1 * | 8/2007 | Price | B62B 1/002 280/47.34 |
| 2010/0019472 | A1 * | 1/2010 | DiLorenzo, Sr. | B62B 3/001 280/653 |
| 2015/0314797 | A1 * | 11/2015 | Hergert | B62B 1/18 280/47.31 |
| 2016/0332649 | A1 * | 11/2016 | Buttimer | B62B 3/08 |

* cited by examiner

Fig. 5
Original 4-wheeled Barrow
Prior Art

SPECIAL BIG-4 WHEELER SWIVEL WHEELED WHEELBARROW

CROSS-REFERENCE TO RELATED APPLICATIONS

This application claims the benefit of U.S. Provisional Patent Application with Ser. No. 62/607,972 filed Dec. 20, 2017, by Lucky W. Price and entitled SPECIAL BIG-4 WHEELER SWIVEL WHEELED WHEELBARROW.

FIELD OF INVENTION

This invention relates to special wheel barrows for transporting material, debris, landscape products, concrete, mortar and other items. Particularly this transport wheel barrow device is related to those special transport wheel barrows that have auxiliary wheels and/or tracks built into the device to aid in the ease and improvement of the effort and energy required to move things. This is especially true of the new wheel barrow device as compared with standard wheel barrows in the construction and landscape industry. This may be featured on the original equipment or as an aftermarket enhancement. This is a heavy duty four-wheeled barrow that has front castors for greater mobility without the need to lift the handles.

FEDERALLY SPONSORED RESEARCH

None.

SEQUENCE LISTING OR PROGRAM

None.

BACKGROUND—FIELD OF INVENTION AND PRIOR ART

The new "Special Big-4 Wheeler Swivel Wheeled Wheelbarrow" described in this specification is an improved wheel barrow device that is designed to easily and quickly install on a heavy duty BIG-4 WHEELER WHEELBARROW wheel barrow and allow that improved combination to augment and increase the capacity for the wheel barrow or at least reduce the energy and effort required to move the loaded wheel barrow.

A. Introduction of the Problems Addressed

Auxiliary devices for most wheel barrows have traditionally focused to install multiple wheels on the front and continue to rely on the operator to lift and control the load from the rear. This does not relieve the strain or energy required of the operator. For heavy duty wheel barrows used in masonry, concrete and landscape activities, these wheel barrows are very heavy and "push the limit" of control by the operators, especially after a period of prolonged use. What is needed is a device that has front and rear wheel support to enable the operator to control and transport heavy loads. The "SPECIAL BIG 4 WHEELER WHEEL BARROW", under U.S. Pat. No. 7,845,654 issued to Price on Dec. 10, 2010, addresses some of these limitations and provides a combination unlike other prior art. This new Special Big-4 Wheeler Swivel Wheeled Wheelbarrow adds features and benefits that will now be described in this application.

B. Prior Art

Historically, there has been some improvements to wheel barrow devices. However, as far as known, there are no wheel barrow devices at the present time which fully meet this need with as few components and superior operation as the present wheel barrow transport device. It is believed that this device is made with fewer parts, of a more durable design, and with much improved support and structural capabilities than any previous heavy duty wheel barrow device.

Examples of prior auxiliary mechanisms for wheel barrows vises begin with U.S. Pat. No. 717,471 issued to Tanner (1902). This device provided dual wheels built into a wheelbarrow and a brake device. However, it teaches a three wheeled mechanism and does not provide any retrofit kits for existing units. Another U.S. Pat. No. 1,735,527 issued to Cwik (1929) addressed a need for a rear wheel in that it provided a single rear wheel which could be adjusted to varying heights. It did not provide the stability of a two rear wheeled device as the "SPECIAL BIG 4 WHEELER WHEEL BARROW".

Another U.S. Pat. No. 2,598,261 was issued to Hrabal (1952). This taught a light duty wheel barrow with small wheels and extendable handles. This would have limited construction use at best. An auxiliary "flip down" wheel system was taught by U.S. Pat. No. 4,061,349 issued to Stahl (1977). An auxiliary wheel assembly maws mounted on a wheelbarrow including a wheel adapted to be pivoted forwardly and secured in elevated condition when out of operative position. The wheel then could be pivoted rearwardly and support the rear portion of said wheelbarrow in operation. This was a single rear wheel without the stability of the current "SPECIAL BIG 4 WHEELER WHEEL BARROW".

A three wheeled barrow was taught by the U.S. Pat. No. 4,767,128 issued to Terhune (1988). This wheelbarrow construction included a forward wheel assembly, adjustable handles, and a rear wheel trailer unit, and a brake unit. This system has "swivel" rear wheels which was unstable for heavy loads and did not have dual front wheels. Next, an improvement was offered by U.S. Pat. No. 5,031,926 issued to Wannamaker (1991). This taught a removable apparatus for utilizing a wheelbarrow with a garden tractor, wherein an elongate frame rail mounted with wheels to provide a towable cart. Two wheels added stability, but it was not for the same use or have the same configuration as the "Special Big-4 Wheeler Swivel Wheeled Wheelbarrow".

In U.S. Pat. No. 5,033,760 issued to Evans (1991), a method of converting a single wheeled wheel barrow to a dual wheeled wheel barrow is taught whereby an extended axle is attached to the structural longerons by rotating the axle attaching brackets rearwardly upon each associated longeron and affixing a wheel laterally outside each longeron. No mention of rear wheels, single or dual, was taught. In the U.S. Design Pat. No. 329,726 issued to Travis (1992), a dual front wheel design is shown, but no rear wheels are depicted.

Another towable conversion for a wheel barrow is taught by U.S. Pat. No. 5,509,681 issued to Keller (1996). No mention of front and rear duals are shown or taught. It teaches a kit for converting a wheelbarrow for use as a towed garden cart is especially suited for wheelbarrows of the type comprising a pan supported on diverging beams. The kit comprises rear wheel assemblies mounted to each of the depending legs and a front hitch plate releasably attached to the forward ends of the beams. Another concept of small rear wheels for light duty wheel barrows was shown in U.S. Pat. No. 6,220,622 issued to Garcia (2001). The Rear Wheel System device includes a frame assembly secured to the underside of the tray of a wheelbarrow adjacent the rear end of the tray and a wheel assembly coupled to the frame assembly. The wheel assembly includes a pair of spaced wheels and is adjustable relative to the frame assembly so as to enable a user thereof to raise and lower the rearward portion of the wheelbarrow.

A further U.S. Pat. No. 6,241,276 issued to Wilburn (2001) demonstrates an adjustable wheel set for light duty wheel barrows. An auxiliary wheel assembly permits utilization of a wheel barrow as a wagon. The auxiliary wheel assembly includes support arms adapted for coupling to a wheelbarrow's tangs. The system is light duty and demonstrates use with a single front wheeled barrow. Next, in U.S. Pat. No. 6,508,478 issued to Ortez (2003) teaches a complex yet light dual wheel assembly. An auxiliary wheeled frame is attached to the legs of a typical wheelbarrow. Pivotable, rotating "castor" wheels are attached to the framework. The result for heavy duty operations is an unstable assembly. A complex series of support and cross bars are taught but will not compensate for the "caster" wheel and light duty concept.

In the U.S. Patent Publication 2003/0006570 published for Baker (2003), a wheel barrow having three wheels is disclosed. A forward wheel is positioned adjacent the point of intersection between two convergent longitudinal frame members, and a pair of rearward wheels are disposed intermediately of the forward and rear ends of the longitudinal frame members. Frame members provide a support carriage for a container. Rear wheels are connected by an axle, and rear axle is connected at each end to frame members by downwardly depending bracket members. The three wheeled assembly does not offer the stability for heavy loads as well as the "Special Big-4 Wheeler Swivel Wheeled Wheelbarrow". In the U.S. Patent Publication 2003/0015852 published for Swift (2003), a wheel barrow with a brake apparatus is taught. The system is a three wheeled concept, however the brake could be incorporated into the "Special Big-4 Wheeler Swivel Wheeled Wheelbarrow" if one desires.

U.S. Patent Publication 2004/0164509 published for Campbell (2004) teaches a wheelbarrow comprising a frame, a pair of handles, and a pair of distal support elements. The tree-wheeled system also teaches a brake method for a light duty wheel barrow. In U.S. Patent Publication 2005/0212237 published for Lin (2005), another three wheeled apparatus is taught. The wheelbarrow includes a frame, a container, a front wheel assembly, an auxiliary dual rear wheel assembly, and a connecting unit. The auxiliary rear wheel assembly includes a shaft and two auxiliary rear wheels journalled respectively on two opposite ends of the shaft. The connecting unit connects the shaft to the leg unit, and permits the shaft to be detached from the frame.

The "SPECIAL BIG 4 WHEELER WHEEL BARROW", under U.S. Pat. No. 7,845,654 issued to Price on Dec. 10, 2010 is an auxiliary wheel assembly mounted on a selected portion of a wheelbarrow comprising: several structural members namely a urethane receptacle barrow, a dual front support and wheel assembly, a rear support and wheel assembly with a plurality of heavy duty wheels, and a means to connect these front and rear assembles and barrow. These members are straight wheeled attachments with no swivel or turning features to assist the movement of a wheel barrel that has a heavy load and is in a tight area for turning. The straight mounting of wheels for the prior art versus these turnable/swivel mounting of the front guide wheels is a major change in the feature given the heavy capacity and load carrying capability. Other prior art teaches away from swivel wheels As far as known, there are no dual wheeled/four wheeled wheel barrow devices at the present time which fully meet the limitations in the field of heavy duty wheel barrows with as few components and superior operation as the present "Special Big-4 Wheeler Swivel Wheeled Wheelbarrow".

SUMMARY OF THE INVENTION

A Special Big-4 Wheeler Swivel Wheeled Wheelbarrow device has been developed for use by a person to move various materials including concrete, mortar, and other materials in an efficient manner. A person normally has to use a standard wheel barrow and exert considerable effort and energy to move various materials in construction, landscaping and other industries. The improved Special Big-4 Wheeler Swivel Wheeled Wheelbarrow device permits the movement of materials in a much easier and ergonomically efficient manner to save both time—cost—and effort (fatigue). It allows guiding of a full load without lifting the handles and provides a manner to pull the wheelbarrow behind a small tractor and pull vehicle.

The preferred embodiment of the Special Big-4 Wheeler Swivel Wheeled Wheelbarrow device is comprised of a). a receptacle barrow; b). a front support and swivel wheel assembly, the support including a connection aperture for pulling the device; c). a rear support and straight wheel assembly, the assembly including a braking system; and d). a means to connect the barrow, front swivel wheel assembly, and the rear wheel assembly whereby the improved device results in guidable front wheels and a durable, ergonomically superior heavy duty construction wheel barrow as compared to a standard construction wheel barrow device and the straight wheeled four wheeled wheel barrow commonly called a Big 4 Wheeler. While the main components are securely connected, the means of connection may be from various types of fasteners or from well designed features built-in during the process of manufacturing.

The newly invented Special Big-4 Wheeler Swivel Wheeled Wheelbarrow features very few parts. In operation, the new Special Big-4 Wheeler Swivel Wheeled Wheelbarrow may be assembled and operated with common tools, without the need for special fasteners.

Objects and Advantages

There are several objects and advantages of the Special Big-4 Wheeler Swivel Wheeled Wheelbarrow. There are currently no known wheel barrow mechanisms that are effective at providing the objects of this invention.

The Special Big-4 Wheeler Swivel Wheeled Wheelbarrow is that is ergonomically designed. It enables a worker to carry and control heavy materials long distances without placing strain and weight on a worker's back, arms or legs. Less strain equates to more energy to complete the job in a faster, more efficient manner. It is an important need to balance the heavy load. Further, the Special Big-4 Wheeler Swivel Wheeled Wheelbarrow saves time on jobs and is easier to handle than standard wheelbarrows. The manufacturing costs are low since the process for making the Special Big-4 Wheeler Swivel Wheeled Wheelbarrow uses the existing wheel barrow assembly lines and production facilities to make it simple to mass produce. Another advantage offered with the Special Big-4 Wheeler Swivel Wheeled Wheelbarrow is that it is designed for durability and unlimited usage. By using durable materials for the barrow and carrying structure with proven, mechanically sound structural designs, the usage and life will be greatly improved as compared to standard wheel barrow designs. Like its Big Four Wheeler predecessor, the Special Big-4 Wheeler Swivel Wheeled Wheelbarrow remains versatile. It can be used in construction, home and garden, landscape, retail stocking, and other industries. It may be used by a professional tradesmen and an untrained do-it-yourselfer (DIY).

Specifically, the Special Big-4 Wheeler Swivel Wheeled Wheelbarrow provides a better way to move materials with a fully supported, wheeled device so that human effort may be significantly reduced:

| Item | Advantage/Improvement |
|---|---|
| 1 | The front swivel wheels enable the two (2) wheels in front to turn right or left at a 360 degree radius, which makes any load in the Wheelbarrow easier to reach its destination by the use of direction of the barrow itself. |
| 2 | There is no need to pick up the rear wheels to correct ones Direction from point A to point B like what must be done with the stationary/straight mounted four (4) wheels on the prior art Big - 4 Wheeler Wheelbarrow. |
| 3 | The swivel feature in front fits all three (3) sizes: a six (6) Cubic Feet, eight (8) Cubic Feet, and ten (10) Cubic Feet version of the Big - 4 Wheeler Wheelbarrow. The under carriages are all the same and can be interchangeable/ compatible with each size. The Specific Front Swivel Wheel Bracket is only compatible to work on the Special Big-4 Wheeler Wheel Barrow found with the U.S. Pat. No. 7,845,654 device. |
| 4 | The Big 4 Wheeler with the Swivel Wheeled front carriage has more ease of movement and turning on solid ground. This enables an operator to direct any heavy load with much less effort to use, especially in tight corner situations. |
| 5 | It may be turned and rotated on the surface/ground all the way around to face the opposite direction without picking up the back wheels/back legs as one would have to do with the straight/stationary wheels on the Special Big-4 Wheeler Wheelbarrow or any other Wheelbarrow on the market today. |

Finally, other advantages and additional features of the present Special Big-4 Wheeler Swivel Wheeled Wheelbarrow will be more apparent from the accompanying drawings and from the full description of the device. For one skilled in the art of devices and improvements for moving construction materials and wheel barrow products, it is readily understood that the features shown in the examples with this mechanism are readily adapted to other types of wheel barrow improvements.

DESCRIPTION OF THE DRAWINGS—FIGURES

The accompanying drawings, which are incorporated in and constitute a part of this specification, illustrate an embodiment of the Special Big-4 Wheeler Swivel Wheeled Wheelbarrow that is preferred. The drawings together with the summary description given above and a detailed description given below serve to explain the principles of the Special Big-4 Wheeler Swivel Wheeled Wheelbarrow. It is understood, however, that the Special Big-4 Wheeler Swivel Wheeled Wheelbarrow is not limited to only the precise arrangements and instrumentalities shown.

FIG. 1 A through 1 D are sketches of the improved assembly of the Special Big Four Wheeled Swivel Wheeled Wheel Barrow.

FIG. 2 A through 2 C are sketches of the Special Big Four Wheeled Swivel Wheeled Wheel Barrow with the various components and features noted.

FIG. 3 A through 3 C are more sketches of the Special Big Four Wheeled Swivel Wheeled Wheel Barrow with the various components and features noted.

FIGS. 4 A through 4 F are sketches of the components and improvements to the Special Big Four Wheeled Swivel Wheeled Wheel Barrow with features shown. FIG. 4 F shows the device in use.

FIGS. 6 A through 6 D is a set of sketches showing the components of an original Special Four Wheeled Wheel Barrow.

DESCRIPTION OF THE DRAWINGS—REFERENCE NUMERALS

The following list refers to the drawings:

| | |
|---|---|
| 31 | general assembly of the Special Big Four Wheeler Swivel Wheeled Wheel Barrow 31 |
| 32 | front straps to reinforce and connect the frame to the barrow 32 |
| 33 | straight front tire assembly of the special four wheeled wheel barrow 33 |
| 34 | support structure (extended) 34 |
| 35 | rear tire assembly 35 with straight wheels |
| 36 | rear straps 36 |
| 36R | right rear strap 36R |
| 36L | left rear strap 36RL |
| 36A | integral loop structure 36A on rear strap 36 |
| 37 | rear axles 37 |
| 38 | means to fasten front and rear axle assemblies to barrow 38 |
| 39 | barrow receptacle structure 39 |
| 40 | handles and support structure 40 |
| 46 | concrete/mortar mixing device 46 |
| 50 | material to be transported 50 |
| 51 | rear tang support 51 of typical wheel barrow |
| 60 | wheel barrow 31, 141 operator 60 |
| 131 | general assembly of the Special Big-4 Wheeler Swivel Wheeled Wheelbarrow 131 |
| 141 | initial concept drawing 141 of the Special Big-4 Wheeler Swivel Wheeled Wheelbarrow |
| 144 | first prototype sample 144 |
| 158 | front barrow support 158 connecting barrow 39 to bracket 160 (bolted to barrow 39 and support 160) |
| 160 | cross structure 160/front swivel wheel bracket |
| 162 | shims 162 |
| 163 | apertures 163 in handles 40 for bolts |
| 164 | means 164 to connect shims 162 to cross structure 160 weld, bolt or equal |
| 166 | threaded fasteners 66 (bolts, nuts/washers) |
| 168 | full swivel wheel assembly 168 |
| 170 | swivel wheel/castor with mounting plate |
| 172 | mounting plate 172 |
| 174 | tire 174 on swivel wheel 170 |
| 200 | top view 200 castor/swivel wheel assembly |
| 210 | bottom view castor 210/swivel wheel assembly |
| 220 | front view castor 220 |
| 300 | rear parking brake 300 |
| 310 | foot lever lock 310 |

-continued

| 320 | foot lever release 320 |
| 324 | securing bolts 324 |
| 330 | tension bar 330 |
| 340 | lock pads 340 |
| 400 | pull behind structure 400 |
| 410 | connection rod 410 |
| 420 | barrow loop 420 with removeable loop |
| 430 | tractor loop 430 with removable fastener |

DETAILED DESCRIPTION OF PREFERRED EMBODIMENT

The present device is a mechanism for a person to transport construction or other materials called a Special Big-4 Wheeler Swivel Wheeled Wheelbarrow 131. This invention relates to special wheel barrows for transporting material, debris, landscape products, concrete, mortar and other items. Particularly this transport wheel barrow device is related to those special transport wheel barrows that have auxiliary wheels and/or tracks built into the device to aid in the ease and improvement of the effort and energy required to move things. This is especially true of the new wheel barrow device as compared with standard wheel barrows in the construction and landscape industry. This may be featured on the original equipment or as an aftermarket enhancement. This is a heavy duty four-wheeled barrow that has front castors for greater mobility without the need to lift the handles.

The preferred embodiment of the Special Big-4 Wheeler Swivel Wheeled Wheelbarrow device is comprised of a). a receptacle barrow; b). a front support and swivel wheel assembly, the support including a connection aperture for pulling the device; c). a rear support and straight wheel assembly, the assembly including a braking system; and d). a means to connect the barrow, front swivel wheel assembly, and the rear wheel assembly whereby the improved device results in guidable front wheels and a durable, ergonomically superior heavy duty construction wheel barrow as compared to a standard construction wheel barrow device and the straight wheeled four wheeled wheel barrow commonly called a Big 4 Wheeler. A person having ordinary skill in the field of wheel barrow devices such as these appreciates the various parts that may be used to physically permit this Special Big-4 Wheeler Swivel Wheeled Wheelbarrow 131 to be produced and utilized.

The improvement over the existing art is providing a device that:

A. The front swivel wheels enable the two (2) wheels in front to turn right or left at a 360 degree radius, which makes any load in the Wheelbarrow easier to reach its destination by the use of direction of the barrow itself.

B. There is no need to pick up the rear wheels to correct ones Direction from point A to point B like what must be done with the stationary/straight mounted four (4) wheels on the prior art Big—4 Wheeler Wheelbarrow.

C. The swivel feature in front fits all three (3) sizes: a six (6) Cubic Feet, eight (8) Cubic Feet, and ten (10) Cubic Feet version of the Big—4 Wheeler Wheelbarrow. The under carriages are all the same and can be interchangeable/compatible with each size. The Specific Front Swivel Wheel Bracket is only compatible to work on the Special Big-4 Wheeler Wheel Barrow found with the U.S. Pat. No. 7,845,654 device.

D. The Big 4 Wheeler with the Swivel Wheeled front carriage has more ease of movement and turning on solid ground. This enables an operator to direct any heavy load with much less effort to use, especially in tight corner situations.

E. It may be turned and rotated on the surface/ground all the way around to face the opposite direction without picking up the back wheels/back legs as one would have to do with the straight/stationary wheels on the Special Big-4 Wheeler Wheelbarrow or any other Wheelbarrow on the market today.

There is shown in FIGS. 1-6 a complete operative embodiment of the Special Big-4 Wheeler Swivel Wheeled Wheelbarrow 131. In the drawings and illustrations, one notes well that the FIGS. 1-6 demonstrate the general configuration and use of this invention. The preferred embodiment of the device is comprised of only a few parts as shown in the drawings. These structural members or parts are comprised of and include, but are not limited to, a urethane barrow 39, a full swivel wheel assembly 168, a rear support and wheel assembly 35 and rear brake system 300, and means to connect these front and rear assembles and barrow 38. Various important features of these member components are delineated in FIGS. 2-6 of the drawings and are described below in appropriate detail for one skilled in the art to appreciate their importance and functionality to the Special Big-4 Wheeler Swivel Wheeled Wheelbarrow 131.

The accompanying drawings, which are incorporated in and constitute a part of this specification, illustrate an embodiment of the Special Big-4 Wheeler Swivel Wheeled Wheelbarrow 131 that is preferred. The drawings together with the summary description given above and a detailed description given below serve to explain the principles of the Special Big-4 Wheeler Swivel Wheeled Wheelbarrow 131. It is understood, however, that the Special Big-4 Wheeler Swivel Wheeled Wheelbarrow 131 is not limited to only the precise arrangements and instrumentalities shown. For example, while four wheels are the preferred embodiment shown, additional wheels might be desired for some applications and still be within the scope and spirit shown here.

FIGS. 1 A through 1 D are sketches of the improved assembly of the Special Big Four Wheeled Swivel Wheeled Wheel Barrow 131. Shown here are: a general assembly of the Special Big Four Wheeled Swivel Wheeled Wheel Barrow 31; an initial concept drawing 141 of the Special Big-4 Wheeler Swivel Wheeled Wheelbarrow; a first prototype sample 144; and a rear parking brake 300.

Figure 1A:
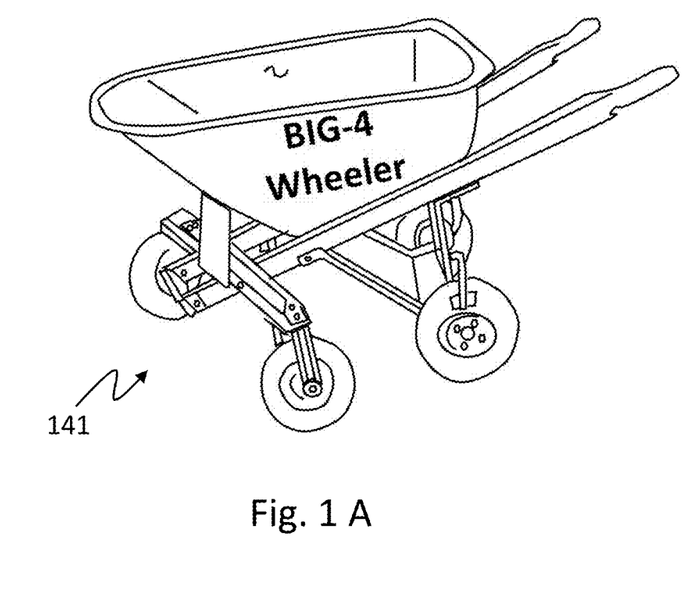
Figure 1B:
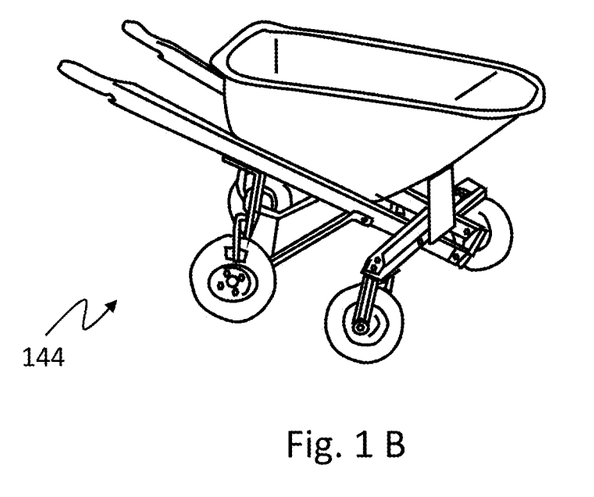
Figure 1C:
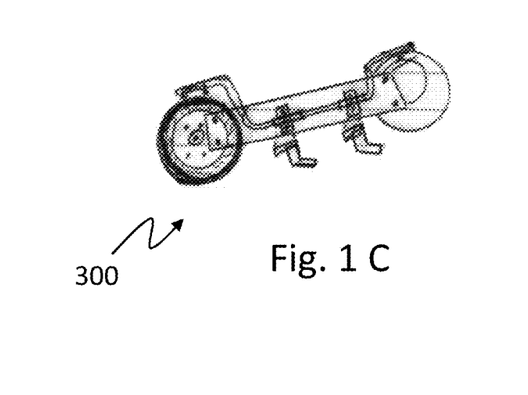
Figure 1D:
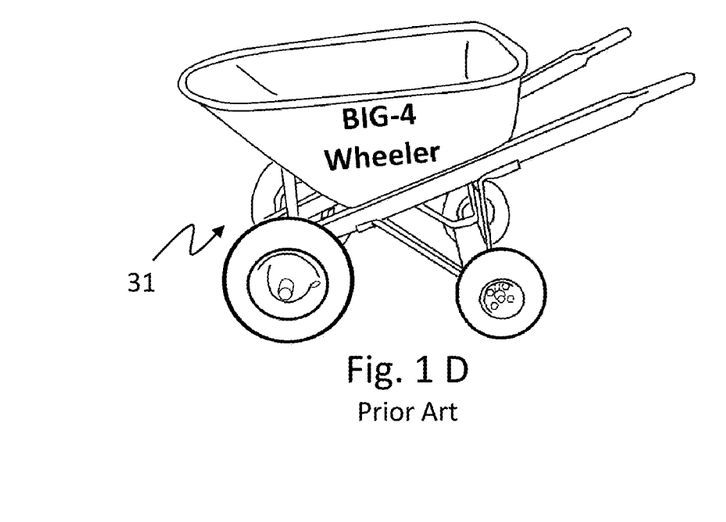
Figure 2:
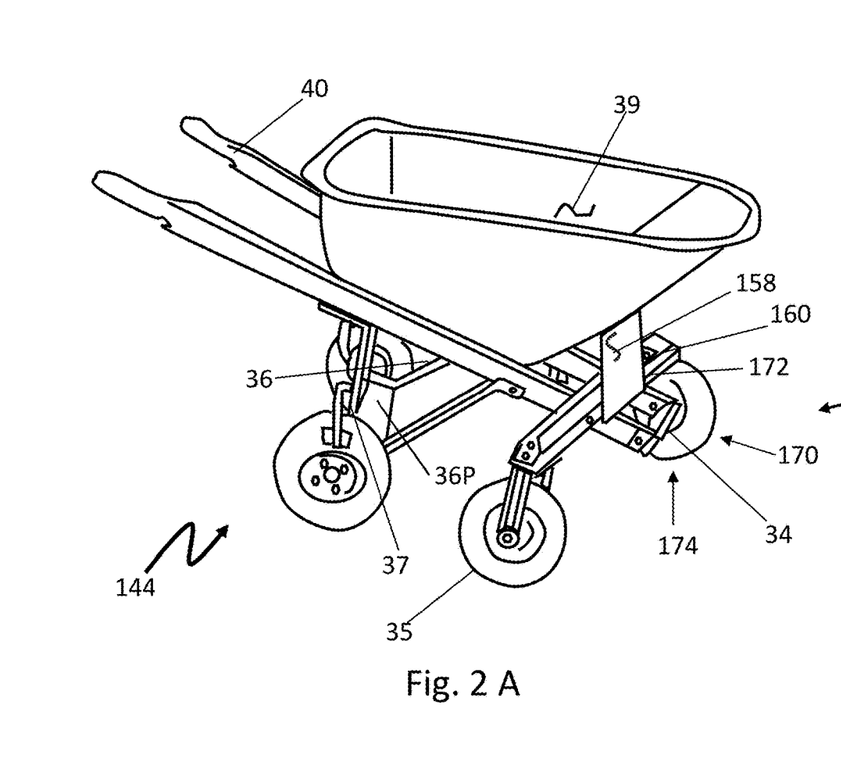
Figure 3:
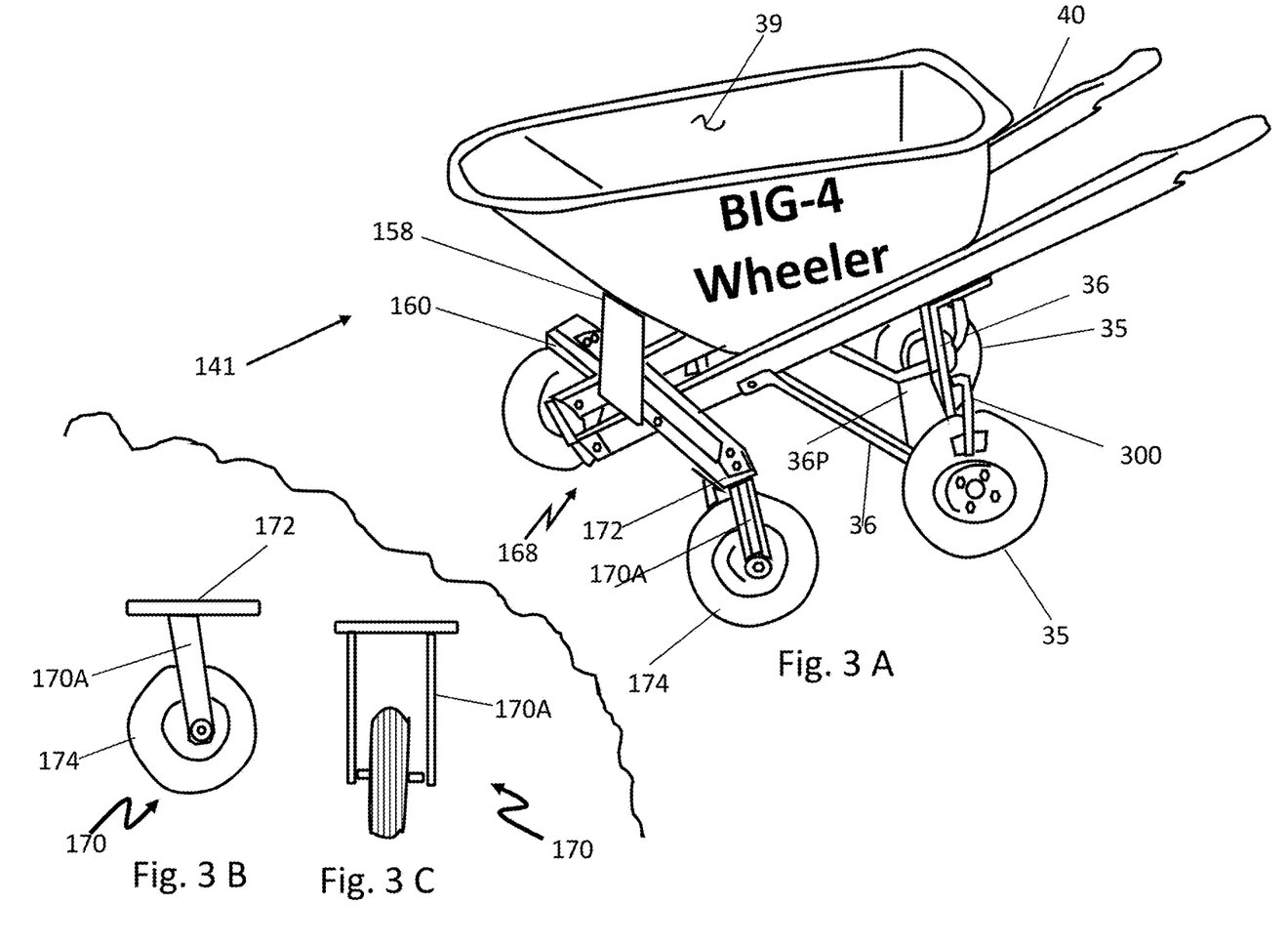

FIG. 2 A through 2 C are sketches of the Special Big Four Wheeled Swivel Wheeled Wheel Barrow with the various components and features noted. Depicted in these views are: a rear tire assembly 35 with straight wheels; a pair of rear straps 36; a rear axle 37; a means to fasten front and rear axle assemblies to barrow 38; a barrow receptacle structure 39; a pair of handles and support structures 40; a first prototype sample 144; a front barrow support 158 connecting barrow 39 to bracket 160; a (bolted to barrow 39 and support 160); a cross structure 160/front swivel wheel bracket; a set of shims 162 (between the bracket 160 and handles 40); a group of apertures 163 in handles 40 for bolts;

means 164 (not shown) to connect shims 162 to cross structure 160 weld, bolt or equal; a group of threaded fasteners 66 (bolts, nuts/washers); a full swivel wheel assembly 168; a swivel wheel/castor 170 with mounting plate; a mounting plate 172; a tire 174 on swivel wheel 170; a pull behind structure 400; a connection rod 410; a barrow loop 420 with removable loop and a tractor loop 430 with removable fastener. FIG. 3 A through 3 C are more sketches of the Special Big Four Wheeled Swivel Wheeled Wheel Barrow with the various components and features noted.

Portrayed here are the following: an initial concept drawing 141 of the Special Big-4 Wheeler Swivel Wheeled Wheelbarrow; a rear tire assembly 35 with straight wheels; a pair of rear straps 36; a rear axle 37; a means to fasten front and rear axle assemblies to barrow 38; a barrow receptacle structure 39; a pair of handles and support structures 40; a front barrow support 158 connecting barrow 39 to bracket 160; a (bolted to barrow 39 and support 160); a cross structure 160/front swivel wheel bracket; a set of shims 162, a group of apertures 163 in handles 40 for bolts, a means 164 to connect shims 162 to cross structure 160 weld, bolt or equal, and a group of threaded fasteners 66 (bolts, nuts/washers) [not shown]; a full swivel wheel assembly 168; a swivel wheel/castor 170 with mounting plate; a mounting plate 172; and a tire 174 on swivel wheel 170; a top view 200 castor/swivel wheel assembly.

Figure 4:
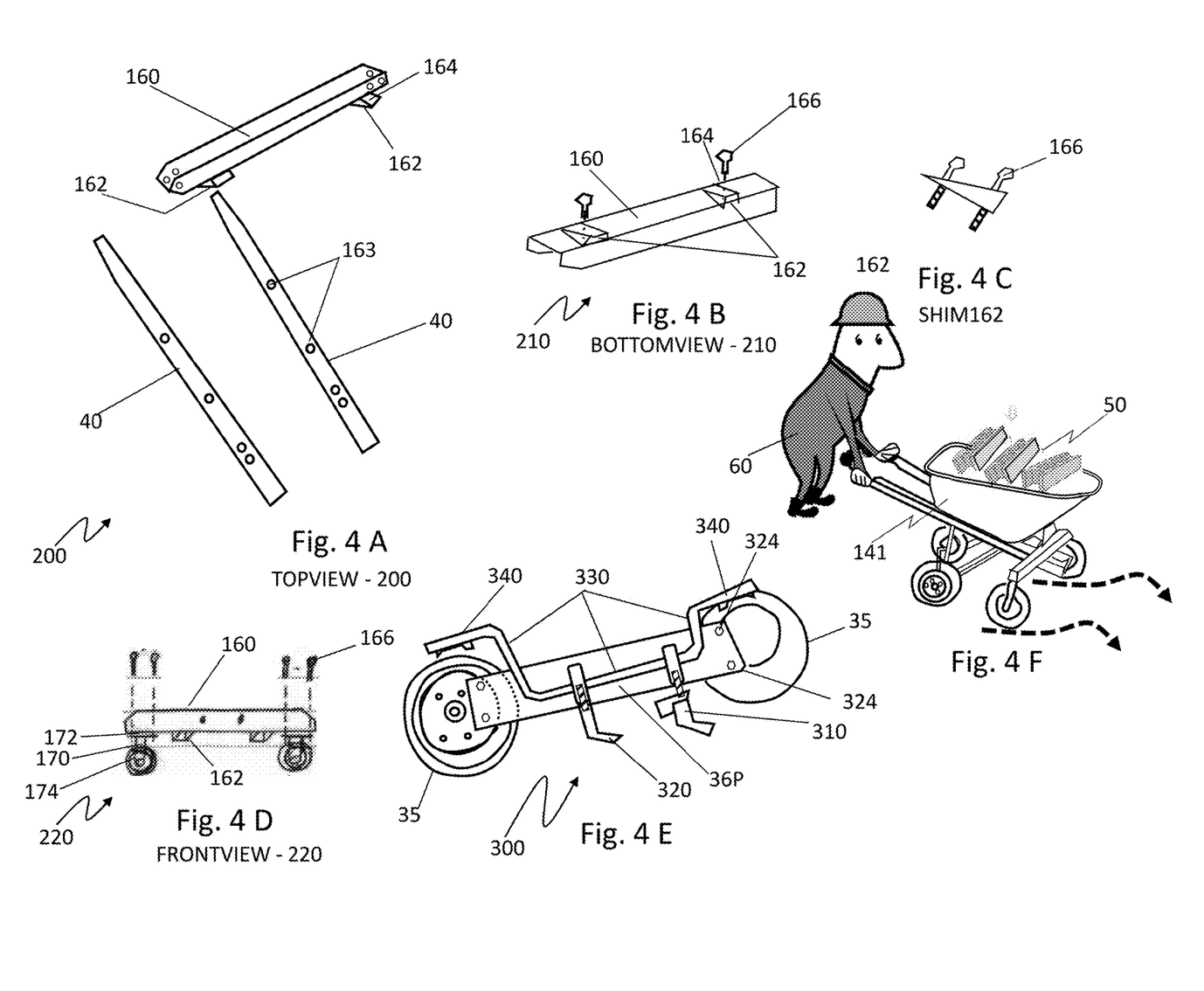

FIGS. 4 A through 4 F are sketches of the components and improvements to the Special Big Four Wheeled Swivel Wheeled Wheel Barrow with features shown. FIG. 4 F shows the device in use. These views show the details of: an initial concept drawing 141 of the Special Big-4 Wheeler Swivel Wheeled Wheelbarrow; a rear tire assembly 35 with straight wheels; a pair of handles and support structures 40; a material to be transported 50; an operator 60; a general assembly of the Special Big-4 Wheeler Swivel Wheeled Wheelbarrow 131; a front barrow support 158 connecting barrow 39 to bracket 160; a (bolted to barrow 39 and support 160); a cross structure 160/front swivel wheel bracket; a set of shims 162; a group of apertures 163 in handles 40 for bolts; means 164 to connect shims 162 to cross structure 160 weld, bolt or equal; a group of threaded fasteners 66 (bolts, nuts/washers); a full swivel wheel assembly 168; a swivel wheel/castor 170 with mounting plate; a mounting plate 172; a tire 174 on swivel wheel 170; a top view 200 castor/swivel wheel assembly; a bottom view castor 210/swivel wheel assembly; a front view castor 220; a rear parking brake 300; a foot lever lock 310; a foot lever release 320; a set of securing bolts 324; a tension bar 330; and a set of lock pads 340.

Figure 5:
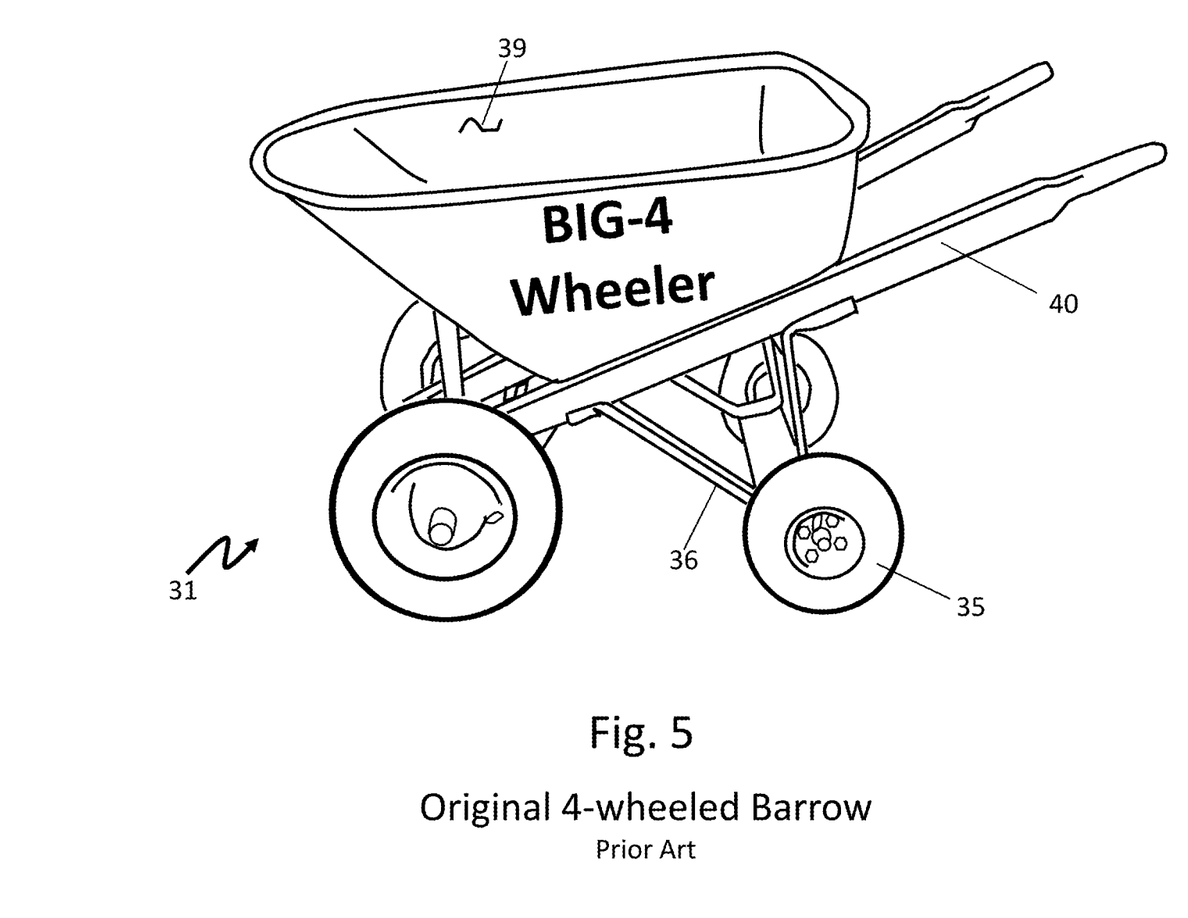
FIG. 5 is a drawings of a typical Special Big Four Wheeled Swivel Wheeled Wheel Barrow now available in the U.S. market.

FIG. 5 is a drawings of a typical Special Big Four Wheeled Swivel Wheeled Wheel Barrow 31 now available in the U.S. market. Components shown include a rear tire assembly 35 with straight wheels; a pair of rear straps 36; a barrow receptacle structure 39; and a pair of handles and support structures 40.

Figures 6A, 6B:
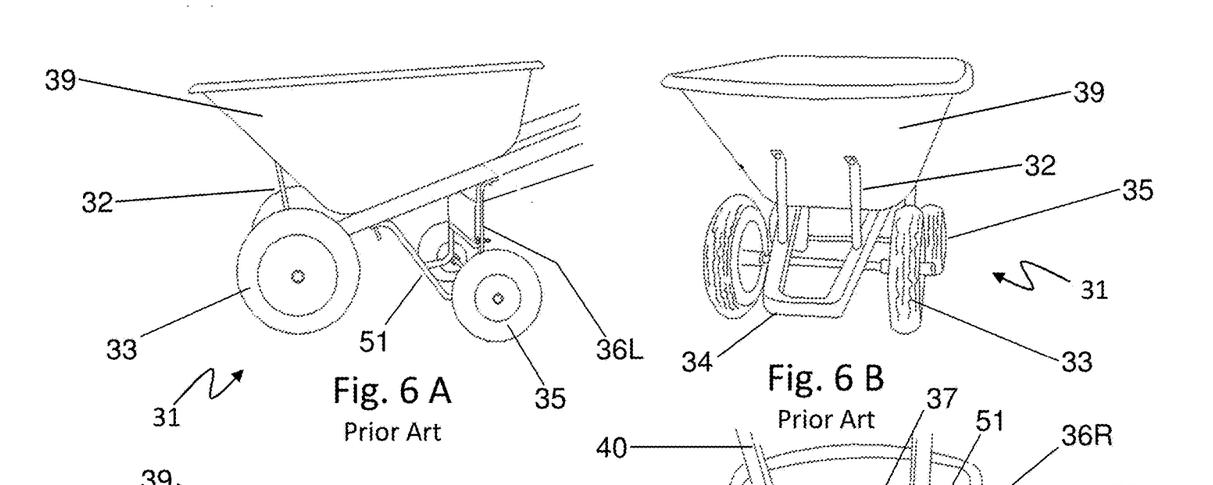
Figures 6C, 6D:
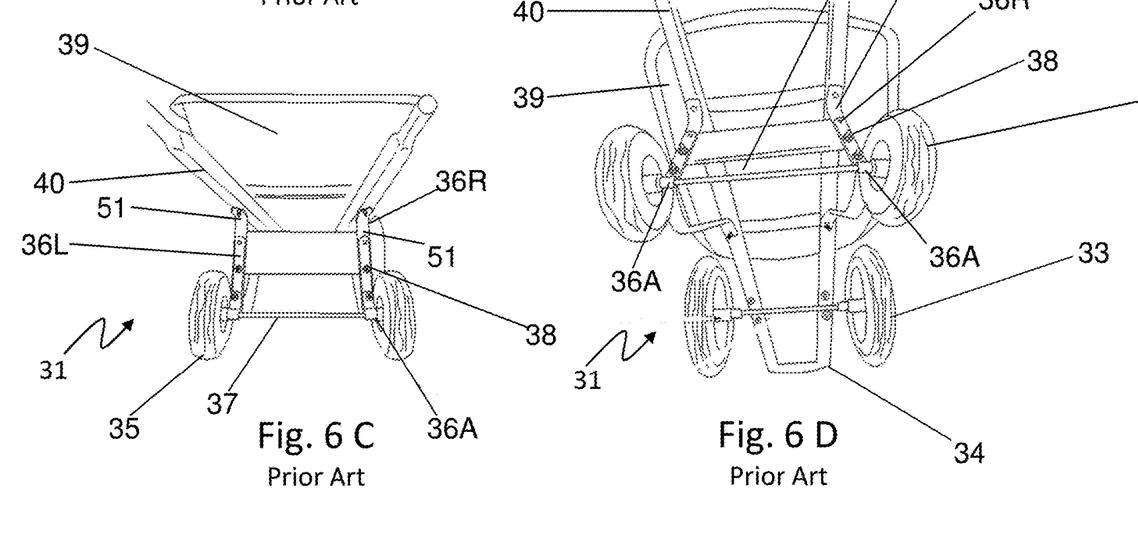

FIGS. 6 A through 6 D is a set of sketches showing the components of an original Special Four Wheeled Wheel Barrow 31. Here are shown: a general assembly of the Special Big Four Wheeled Swivel Wheeled Wheel Barrow 31; a set of front straps to reinforce and connect the frame to the barrow 32; a straight front tire assembly of the special four wheeled wheel barrow 33; a support structure (extended) 34; a rear tire assembly 35 with straight wheels; a pair of rear straps 36; a right rear strap 36R; a left rear strap 36RL; an integral loop structure 36A on rear strap 36; a rear axle 37; a means to fasten front and rear axle assemblies to barrow 38; a barrow receptacle structure 39; and a pair of handles and support structures 40.

This wheel barrow structure has been traditionally a hard wood treated for resistance to moisture and weather. One skilled in the art of outdoor tools appreciates well the substitution of composite material, a rigid urethane materials, a metal such as a stamped steel material, a cast steel material, and a stamped aluminum material, or the like to accomplish the same weather resistance with high strength properties. The means to secure 38 the components can be various fastening systems including, for Special Big 4 Wheeler Swivel Wheeled Wheelbarrow cont. 28 of 37 example and not as a limitation, a threaded bolt, washer and nut system; a rivet system; a weldment; or some equivalent connection system. The scope and spirit of this invention does not require the means to connect 38 to be easily replaced (i.e., not a semi-permanent weldment). However, one skilled in assembly techniques recognizes that the some connection systems 38 such as threaded components better lend themselves to After Market assemblies whereas a weldment may be more economical for original equipment installations of the Special Big-4 Wheeler Swivel Wheeled Wheelbarrow 131.

The details mentioned here are exemplary and not limiting. Other specific components specific to describing a Special Big-4 Wheeler Swivel Wheeled Wheelbarrow 131 may be added as a person having ordinary skill in the field of construction devices and material moving devices well appreciates.

Operation of the Preferred Embodiment

The new Special Big-4 Wheeler Swivel Wheeled Wheelbarrow 131 has been described in the above embodiment. The manner of how the device operates is described below. One notes well that the description above and the operation described here must be taken together to fully illustrate the concept of the Special Big-4 Wheeler Swivel Wheeled Wheelbarrow 131. The preferred embodiment of the Special Big-4 Wheeler Swivel Wheeled Wheelbarrow device is comprised of a). a receptacle barrow; b). a front support and swivel wheel assembly, the support including a connection aperture for pulling the device; c). a rear support and straight wheel assembly, the assembly including a braking system; and d). a means to connect the barrow, front swivel wheel assembly, and the rear wheel assembly whereby the improved device results in guidable front wheels and a durable, ergonomically superior heavy duty construction wheel barrow as compared to a standard construction wheel barrow device and the straight wheeled four wheeled wheel barrow commonly called a Big 4 Wheeler.

Referring back to FIG. 4 A through 4 F one skilled in manufacturing appreciates that all the features may be built into the Special Big-4 Wheeler Swivel Wheeled Wheelbarrow 131 during the original build of the product. At that time of production, the process of connecting the rear wheels 35 may be added to the other existing production processes to enable a typical or standard wheel barrow device to have the rear wheel 35 with a brake system 300 and other features and front swivel wheels 168.

Additionally, the configuration described above permits the Special Big-4 Wheeler Swivel Wheeled Wheelbarrow 131 to be added to existing wheel barrows to enable them to have the rear wheel 35 features and front wheel castor and swivel options. One skilled in After Market assembly appreciates well the ease of adding the front straps 32 for increased strength of the barrow receptacle 39. This is required since the Special Big-4 Wheeler Swivel Wheeled Wheelbarrow 131 permits an operator or worker 47 to guide, push and to transport relatively heavier loads when compared to a typical wheel barrow configuration which requires the worker 47 to "lift and balance" from the handles 40.

With this description it is to be understood that the Special Big-4 Wheeler Swivel Wheeled Wheelbarrow 131 is not to be limited to only the disclosed embodiment. The features of the Special Big-4 Wheeler Swivel Wheeled Wheelbarrow 131 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

What is claimed as new and desired to be protected by Letters Patent is:

1. An improved swivel wheeled wheelbarrow device comprising:
   a). a receptacle barrow (39) with a pair of fixed handles (40) secured along an exterior of the receptacle barrow;
   b). a front support and swivel wheel assembly comprised of a cross structure (160) with a set of apertures (163), a pair of swivel wheels (170) with a pair of mounting plates (172), a pair of shims (162) with a means to connect (164) the pair of shims to the cross structure (160), a pair of connecting threaded fasteners (166), the front support including a barrow loop (420) on an extended support structure (34) for pulling the device;
   (c). a front barrow support (158) and bolts securing the front barrow support between the receptacle barrow (39) and the cross support (160);
   (d). a rear tire assembly (35) with a pair of straight wheels, the tire assembly including a rear parking brake (300); and
   (e). a pair of rear straps (36) to connect the barrow and the rear tire assembly (35)
   whereby the improved device results in guidable front wheels and a durable, ergonomically superior heavy duty construction wheel barrow as compared to a standard construction wheel barrow device and the straight wheeled four wheeled wheel barrow commonly called a Big 4 Wheeler and wherein an operator can guide, push and transport by hand, without lifting the handles and with reduced energy and effort, a relatively heavier load when compared to a typical wheel barrow configuration which requires the worker to lift and balance the heavier load from the handles.

2. The device according to claim 1 wherein the receptacle barrow is comprised of a durable material.

3. The device according to claim 2 wherein the durable material is selected from a group consisting of a metal and a composite material.

4. The device according to claim 3 wherein the composite material is a rigid urethane material.

5. The device according to claim 3 wherein the metal is selected from a group consisting of a stamped steel material, a cast steel material, and a stamped aluminum material.

6. A front swivel wheeled conversion kit as an attachment to a 4-wheeled manually operated wheelbarrow device made with a pair of front and a pair of rear straight wheels and a receptacle barrow (39), the attachment of the front swivel wheeled conversion kit comprising:

(a). a front support and swivel wheel assembly for replacing the pair of front straight wheels, the assembly comprised of a cross structure (160) with a set of apertures (163), a pair of swivel wheels (170) with a pair of mounting plates (172), a pair of shims (162) with a means to connect (164) the pair of shims to the cross structure (160), a pair of connecting threaded fasteners (166), the front support including a barrow loop (420) on an extended support structure (34) for pulling the device;

(b). a front barrow support (158) and bolts for securing the front barrow support between the receptacle barrow (39) and the cross support (160);

(c). a rear tire assembly (35) to attach to the pair of rear straight wheels, the rear tire assembly including a rear parking brake (300); and (d). a pair of rear straps (36) to connect the barrow and the rear tire assembly (35) whereby the attachment of the front swivel wheeled conversion kit when mounted to the 4-wheeled manually operated wheelbarrow device made with the pair of front and the pair of rear straight wheels results in guidable front wheels and wherein an operator can guide, push and transport by hand, without lifting the handles and with reduced energy and effort, a relatively heavier load when compared to a typical 4-wheeled barrow of with the pair of front and the pair of rear straight wheels configuration which requires the worker to lift and balance the heavier load from the handles.

* * * * *